United States Patent
Müller et al.

(10) Patent No.: US 8,982,784 B2
(45) Date of Patent: Mar. 17, 2015

(54) SENSOR AND SENSOR NETWORK FOR AN AIRCRAFT

(75) Inventors: Jan Müller, Hamburg (DE); Daniel Glaser, Hamburg (DE); Uwe Schwark, Ottersberg (DE)

(73) Assignee: Airbus Operations GmbH (DE)

( * ) Notice: Subject to any disclaimer, the term of this patent is extended or adjusted under 35 U.S.C. 154(b) by 358 days.

(21) Appl. No.: 13/201,477

(22) PCT Filed: Feb. 12, 2010

(86) PCT No.: PCT/EP2010/051793
§ 371 (c)(1),
(2), (4) Date: Aug. 15, 2011

(87) PCT Pub. No.: WO2010/092152
PCT Pub. Date: Aug. 19, 2010

(65) Prior Publication Data
US 2011/0299470 A1 Dec. 8, 2011

Related U.S. Application Data

(60) Provisional application No. 61/153,047, filed on Feb. 17, 2009.

(30) Foreign Application Priority Data

Feb. 16, 2009 (DE) .......................... 10 2009 009 189

(51) Int. Cl.
*H04W 4/00* (2009.01)
*H04Q 9/00* (2006.01)
(52) U.S. Cl.
CPC ............. *H04Q 9/00* (2013.01); *H04Q 2209/10* (2013.01); *H04Q 2209/40* (2013.01); *H04Q 2209/886* (2013.01); *H04Q 2209/823* (2013.01)
USPC .......................................... 370/328; 370/400
(58) Field of Classification Search
CPC .................. H01L 27/14603; H01L 27/14687; H01L 27/14601; H01L 27/14609; H01L 27/14647
See application file for complete search history.

(56) References Cited

U.S. PATENT DOCUMENTS

| | | | |
|---|---|---|---|
| 5,970,395 A * | 10/1999 | Weiler et al. | ............... 455/67.13 |
| 6,587,188 B2 | 7/2003 | Gleine et al. | |
| 6,617,963 B1 | 9/2003 | Watters et al. | |
| 6,806,808 B1 | 10/2004 | Watters et al. | |
| 7,620,364 B2 | 11/2009 | Higashida et al. | |
| 2001/0026362 A1 | 10/2001 | Gleine et al. | |
| 2005/0213548 A1 | 9/2005 | Benson et al. | |
| 2007/0114422 A1* | 5/2007 | Berkcan et al. | ............ 250/358.1 |
| 2007/0116103 A1* | 5/2007 | Atarius et al. | ................ 375/148 |

(Continued)

FOREIGN PATENT DOCUMENTS

| | | |
|---|---|---|
| CN | 101009619 A | 8/2007 |
| CN | 101286907 A | 10/2008 |
| DE | 10004384 A1 | 8/2001 |
| DE | 102007055090 A1 | 5/2009 |

(Continued)

*Primary Examiner* — Jung Park
(74) *Attorney, Agent, or Firm* — Lerner, David, Littenberg, Krumholz & Mentlik, LLP (57) ABSTRACT

The invention relates to a sensor network in an aircraft, which comprises several sensor nodes that communicate with a central data collection and evaluation unit via a radio transmission path. Data transmission can take place in various ways. For example, different frequency ranges are provided, from which the respective frequency range enabling the best data transmission quality is selected.

14 Claims, 8 Drawing Sheets

(56) References Cited

U.S. PATENT DOCUMENTS

| | | |
|---|---|---|
| 2007/0118335 A1* | 5/2007 | Andarawis et al. ............ 702/188 |
| 2007/0204699 A1 | 9/2007 | Salvo et al. |
| 2008/0036617 A1 | 2/2008 | Arms et al. |
| 2008/0228331 A1* | 9/2008 | McNerney et al. ................ 701/3 |
| 2011/0112775 A1 | 5/2011 | Bramban |
| 2011/0184591 A1* | 7/2011 | Kordt ................................ 701/3 |

FOREIGN PATENT DOCUMENTS

| | | |
|---|---|---|
| JP | 06-242222 | 9/1994 |
| JP | 2002538519 A | 11/2002 |
| JP | 2005303494 A | 10/2005 |
| JP | 2007243884 A | 9/2007 |
| JP | 2008536756 A | 9/2008 |
| WO | 2009/062635 A1 | 5/2009 |

* cited by examiner

SENSOR AND SENSOR NETWORK FOR AN AIRCRAFT

CROSS REFERENCE TO RELATED APPLICATIONS

This application is a national phase entry under 35 U.S.C. §371 of International Application No. PCT/EP2010/051793, filed Feb. 12, 2010, published in German, which claims the benefit of the filing date of German Patent Application no. 10 2009 009 189.0 filed Feb. 16, 2009 and of U.S. Provisional Patent Application No. 61/153,047 filed Feb. 17, 2009, the entire disclosures of which are hereby incorporated herein by reference.

FIELD OF THE INVENTION

The invention relates to the wireless transmission of measured sensor values inside of aircraft. In particular, the invention relates to a sensor node for acquiring and pre-processing measured values in an aircraft, a sensor network for an aircraft, an aircraft as well as a method for ascertaining the state of a system component in an aircraft.

TECHNOLOGICAL BACKGROUND

Sensors in aircraft are used to detect physical measuring variables, with which conclusions can be drawn about the state of an aircraft system component, etc. These sensors are hooked up to a power supply and evaluator by means of corresponding electrical lines. In light of weight restrictions in aircraft construction along with the complexity of necessary electrical cabling for a sensor network, sensors are currently used only very sparingly, and just in places where essential.

To improve and accelerate the preventative maintenance sequence for the aircraft, it is desirable to be able to ascertain the state of all relevant system components and fixtures in a timely manner, and make it available to a central unit for acquisition and evaluation.

DE 100 04 384 A1 and U.S. Pat. No. 6,587,188 B2 describe sensor arrangements for acquiring temperatures. The sensor exhibits an optical fiber, with which stresses in the material can be detected. Such sensors cannot be installed at all locations within an aircraft.

SUMMARY OF THE INVENTION

One object of the invention is to provide an improved way of monitoring system components and fixtures in an aircraft.

Indicated herein are sensor nodes for acquiring measured values in an aircraft, a sensor network, an aircraft and a method according to the features in the independent claims. Further developments of the invention may be gleaned from the subclaims.

The described exemplary embodiments apply equally to the sensor node, the sensor network, the aircraft and the method. In other words, the features mentioned below, for example in relation to the sensor nodes, can also be implemented as procedural steps, and vice versa.

One aspect of the invention indicates a sensor node for acquiring measured values in an aircraft, which exhibits a sensor unit, a power supply unit, a processor unit and a transmitting/receiving unit. The sensor unit is used to acquire the measured values. The measured values make it possible to draw conclusions about the state of a corresponding system component of the aircraft or corresponding fixtures. This is enabled by accommodating the sensor unit (and hence the entire sensor node) in proximity to the system component, or integrating it therein.

The power supply unit is designed to supply the sensor node with electrical energy, and the processor unit is used to preliminarily process the acquired measured values. The transmitting/receiving unit is designed for wirelessly transmitting the acquired preliminarily processed measured values to a central data collection and evaluation unit.

It must be noted at this juncture that while the acquired measured values can be preliminarily processed in the sensor node, this is not absolutely necessary. As a rule, the quantity of measured data accruing in a sensor node will determine whether preliminary processing within the sensor node and the type of measured data is required. As an alternative, this processing can also take place in the central data collection and evaluation unit.

In a simple embodiment, the sensor node exhibits only the sensor unit, power supply unit and transmitting/receiving unit. A processor unit is not necessary. Rather, the acquired measured values are relayed directly to the transmitting/receiving unit by the sensor unit, and then wirelessly transmitted.

For example, the sensor node is used to monitor highly stressed structural assemblies in the aircraft (structure monitoring).

Another aspect of the invention indicates a sensor network for an aircraft, which comprises several sensor nodes described above and below. In addition, the sensor network comprises a central data collection and evaluation unit for collecting and evaluating the transmitted data.

The sensor network can have a completely wireless design, and along with the various sensor nodes, comprises a data concentrator and an application server with the corresponding software. The new system may here use constituents of already existing aircraft systems. These include the hardware of the application server and the closed-loop, so-called backbone bus.

The sensor network makes it possible to comprehensively monitor the state of the aircraft. The data accrued from monitoring are not processed by the sensor network itself, but rather are made available to other systems (hereinafter also referred to as "aircraft user systems"). As a consequence, the sensor network offers a comprehensive service, and can additionally furnish a platform to supply information to a variety of aircraft user systems. Therefore, sensor data for realizing functions from the cabin area, e.g., seat status monitoring or air conditioning system control, are just as much encompassed by the data provided as sensor information about the wing status, structural monitoring of the aircraft or landing gear.

Functions that go beyond relaying sensor data can also be realized with the sensor network. For example, lines installed in the aircraft for transmitting binary information, so-called "discrete key lines", can be replaced by a function of the sensor network. The information to be transmitted is here received from a sensor node, just like sensor information, and relayed to the application computer, where it is made available to the aircraft user system via a software interface.

Therefore, the invention provides a sensor platform that can be used by a large number of "users". For example, these users include components of an air conditioning system, electrical components in a cabin and/or cockpit, actuators for the wings or tail assembly components, etc.

As a consequence, sensors can be supplied throughout the aircraft, wherein the basic components in the sensor node (power supply unit and transmitting/receiving unit) can be designed identically for all sensor nodes. For example, the various sensor nodes differ only in terms of the individual sensor units for acquiring the measured values.

In an exemplary embodiment of the invention, the power supply unit, sensor unit and transmitting/receiving unit are modular in design.

Another aspect of the invention indicates a modular assembly system for providing a sensor network described above and below.

In another exemplary embodiment of the invention, the power supply unit is designed to autonomously supply power to the sensor node through energy conversion. This yields a sensor node designed for monitoring and control by means of a wireless link and autonomous power supply.

This eliminates the need for electrical lines.

As a result, the sensor nodes can also be installed at locations that had not previously been accessible for conventional sensors.

Energy conversion takes place directly at or in the sensor node. An external current/voltage source is not required.

In another exemplary embodiment of the invention, the power supply unit exhibits a vibration generator for providing the sensor node with a decentralized power supply. The vibration generator converts vibration or acceleration energy arising in the aircraft into electrical energy. For example, this energy conversion takes place inductively.

In another exemplary embodiment of the invention, the power supply unit exhibits a thermoelectric transducer for providing the sensor node with a decentralized power supply.

In this way, a temperature difference can be utilized for energy production.

In another exemplary embodiment of the invention, the power supply unit exhibits an antenna to receive electromagnetic energy for providing the sensor node with a decentralized power supply.

For example, the antenna can be configured similarly to the antenna of an RFID tag. The produced electrical energy can be stored in a capacitor, for example.

In another exemplary embodiment of the invention, the power supply unit exhibits a photovoltaic unit to convert light into electrical energy for providing the sensor node with a decentralized power supply.

Let it be explicitly noted at this juncture that the sensor node can exhibit both one or even several of the conversion units mentioned above for generating electrical energy. For example, both a vibration generator and a thermoelectric transducer can be provided.

In another exemplary embodiment of the invention, the transmitting/receiving unit is designed to wirelessly transmit the acquired, preliminarily processed measured values for two or more separate frequency ranges.

Therefore, a redundancy is provided for transmission. Depending on the required transmission signal quality and potentially present spurious signals, one or more frequency ranges can optionally be selected. Transmission can also take place in parallel in all supported frequency ranges.

A primary controller decides which frequency range (s) to use as a function of specific criteria, for example quality of received signal, measured interferences, or also events such as a change in the flight status of the aircraft (e.g., from 'cruise' to 'descent' or 'descent' to 'approach'). This primary controller can either be implemented centrally within the central data collection and evaluation unit, or peripherally within the sensor node. Therefore, a central (or peripheral) primary controller is provided that decides which used frequency range(s) is/are selected as a function of specific criteria, such as signal quality, measured interference, flight status of aircraft, etc.

In another exemplary embodiment of the invention, the transmitting/receiving unit is hence designed in such a way as to automatically change the frequency range for transmission if the transmission signal quality drops below a prescribed level.

In particular, the transmitting/receiving unit can not only transmit signals, but also receive signals. For example, the central data collection and evaluation unit can periodically send test signals to the transmitting/receiving unit, which then are analyzed and evaluated by the processor unit of the sensor node. This allows the transmitter unit to determine which frequency range and/or data transmission channel is best. A switch can then be made automatically to this channel.

However, it is similarly possible for the central data collection and evaluation unit to measure the quality of the signals it receives and, based on the measuring result, direct the transmitting/receiving unit to select a specific channel, thereby always ensuring optimal data transmission quality.

In another exemplary embodiment of the invention, the transmitting/receiving unit is designed in such a way as to automatically change the frequency range for transmission when an event arises. Events can include the detection of interference on the high-frequency transmission channel currently being used. In addition, it is possible for frequencies to be switched given a change in flight phase, e.g., from 'cruise' to 'descent' or 'descent' to 'approach'.

In another exemplary embodiment of the invention, the transmitting/receiving unit for changing the transmission/reception frequency is designed based on a prescribed frequency hop sequence. In other words, the transmission/reception frequency in this exemplary embodiment is automatically varied based on a previously agreed hop sequence. This type of frequency hopping procedure makes it possible to avoid narrow-band interference sources.

In another exemplary embodiment of the invention, the sensor unit is designed to acquire a measured value, which can be a temperature, vibration, acceleration, high-frequency signal power, expansion, pressure or position, as well as a logical address of the connected sensors/sensor system for identifying system components.

Another exemplary embodiment of the invention indicates a sensor network for an aircraft, which exhibits a sensor node described above and below, along with a central data collection and evaluation unit for collecting and evaluating the transmitted (or preliminarily processed) measured data.

In another exemplary embodiment of the invention, the sensor nodes along with the central data collection and evaluation unit are designed to encrypt the transmitted data. This makes it possible to avoid the risk of misuse or the risk of data from a transmitter not belonging to the sensor network being received and considered.

In another exemplary embodiment of the invention, the sensor network is designed to monitor the allocation of a frequency range provided for transmission, both at the sensor node installation site and a transmitting and receiving station of the sensor network.

In another exemplary embodiment of the invention, the sensor network is designed for adaptive route determination in order to identify a new communication path if the transmission signal quality drops below a prescribed level.

Let it be noted at this juncture that very special conditions for the propagation of transmitted signals reign in an aircraft, in particular if the wirelessly transmitted signals are high-frequency signals. One reason for the above is that the aircraft exhibits numerous elements that dampen or even absorb the signals. Possible examples include the primary and secondary structure, in particular the walls and partitions in the fuselage of the aircraft and other fixtures.

For this reason, the invention can provide that the sensor network be divided into one or more subnetworks exhibiting corresponding nodes (data concentrators, wireless data concentrators) for collecting the sensor node data. These nodes can then be wirelessly linked and/or hard-wired to the central data collection and evaluation unit.

Another exemplary embodiment of the invention indicates an aircraft with a system component and a sensor network described above and below for ascertaining a state of the system component.

Another exemplary embodiment of the invention indicates a method for ascertaining the state of a system component in an aircraft, in which a sensor node is supplied with electrical energy by a power supply unit in the sensor node. Additional sensor nodes can also be supplied with energy by their own separate power supply units. Furthermore, the measured values are acquired in the area of the system component by the sensor node. Other sensor nodes can acquire additional measured values of other system components or fixtures in the aircraft. If desired, the acquired measured values are preliminarily processed within the sensor node by means of a processor provided for this purpose. The acquired (and possibly preliminarily processed) measured values are then wirelessly transmitted to a central data collection and evaluation unit.

Exemplary embodiments of the invention will be described below drawing reference to the figures.

DETAILED DESCRIPTION OF EXEMPLARY EMBODIMENTS

The depictions on the figures are schematic and not to scale.

The following description of figures uses the same reference numbers for identical or similar elements.

Figure 1:
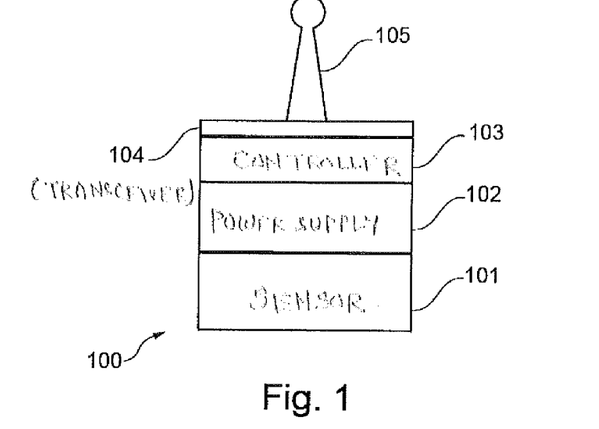
FIG. 1 shows a sensor node according to an exemplary embodiment of the invention.

FIG. 1 shows a sensor node 100. The sensor node exhibits a sensor unit 101, a power supply unit 102, a processor unit for preliminarily processing the measured data (controller) 103, as well as a transmitting/receiving unit (transceiver) 104 with a transmitting/receiving antenna 105.

The sensor node does not have to be partitioned in the form of individual physical structural units. Rather, functional units can be present that make up part of a cohesive module. For example, it is possible for the processor and transmitting/receiving units to be integrated on a physical semiconductor chip.

In addition, attachments can be provided for securing the sensor node to a structural component of the aircraft or a system component.

The sensor node is hooked up to a central data collection and evaluation unit with a low installation and maintenance outlay. The aircraft can incorporate a plurality of such sensor nodes 100, which can be secured to various locations inside and outside the aircraft.

For example, the sensor units of the sensor nodes can acquire temperature, vibration, acceleration, high-frequency signal power, expansion, pressure, position/location, etc., or also ascertain and transmit logical addresses of connected sensors/sensor systems for determining the identity of a system component. This sensor-based acquisition of the most varied of parameters makes it possible to make aircraft maintenance, operation and construction more efficient. For example, each sensor node can send its acquired measured data (if necessary after preliminarily processed and filtered/analyzed) along with the position or identification number of the respective sensor to the central data collection and evaluation unit. In this way, each ascertained measured value can be assigned a specific location in the aircraft, making it possible to support and facilitate aircraft maintenance, as well as the optimization of existing and development of new aircraft types.

The sensors or sensor nodes are connected to the central data collection and evaluation unit by means of wireless transmission technology, which makes it possible to link the sensor nodes without any additional infrastructural outlay (e.g., electrical or optical lines).

The advantage to wireless transmission becomes particularly obvious when power supply to the sensors is also autonomous. The described sensor nodes enable a wireless transmission of sensor data within the aircraft, as well as an autonomous conversion of energy required by the sensor nodes at or near the installation site of the corresponding sensors.

As a consequence, the sensor nodes do not have to be connected with the respective acquisition system by means of dedicated lines provided for this purpose.

Figure 2:
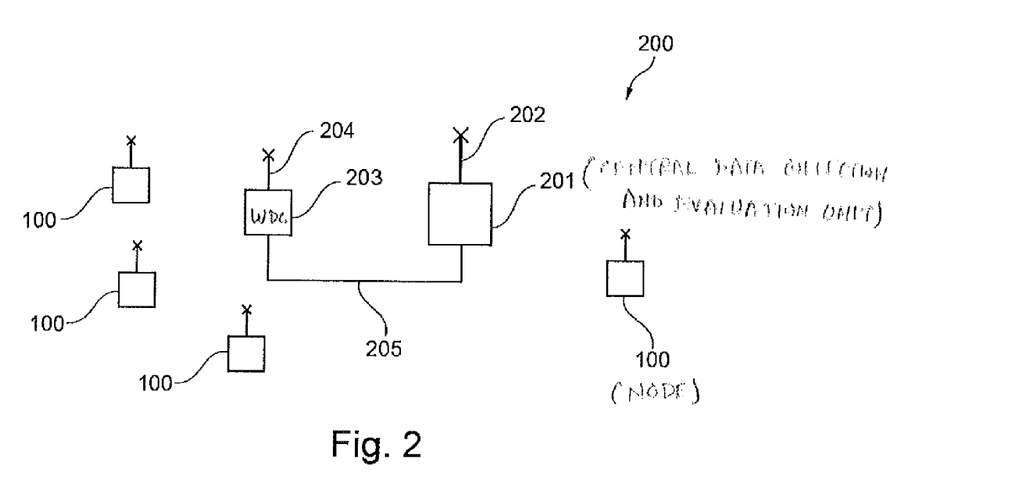
FIG. 2 shows a sensor network according to an exemplary embodiment of the invention.

FIG. 2 shows a sensor network 200 with several sensor nodes 100, a central data collection and evaluation unit 201 with a transmitting/receiving antenna 202 as well as another transmitting/receiving station 203 with corresponding transmitting/receiving antenna 204, which serves as a so-called Wireless Data Concentrator (WDC).

The various sensor nodes 100 can communicate with the central data collection and evaluation unit 201 via the Wireless Data Concentrator 203 or directly with the central data collection and evaluation unit. The Wireless Data Concentrator 203 can communicate with the central unit 201 by means of a hard-wired communications connection 205 or wirelessly.

The configuration of the wireless sensor network will be described below according to an exemplary embodiment of the invention:

The wireless sensor network 200 for operation in the aircraft satisfies the requirements with regard to secure data/information transmission inside aircraft. This also applies in particular when the sensor network is used for purposes relevant to flight safety, or the transmitted data have a direct or indirect impact on flight safety.

Since the wireless transmission channel (e.g., the radio channel) is generally susceptible to interference, it has a redundant design. For example, at least two separate frequency ranges are used for transmission so as to minimize the probability of a failure in the wireless transmission path. These frequency ranges are far enough apart in the frequency range to make collective and simultaneous interference caused by a single noise source unlikely.

In one possible configuration of the transmission technology, a transceiver pair determines the degree of interference based on suitable indicators (e.g., by using an interference output meter or measuring a bit error rate during transmission) and changes the frequency range when a defined maximum interference power or bit error rate has been exceeded, thereby avoiding the interference.

In another configuration, a transceiver pair varies its transmitting/receiving frequency according to a previously agreed hop sequence.

When combined with error avoidance techniques, for example a corresponding error correction (forward error correction) and error recognition (cyclic redundancy check), this makes it possible to ensure an adequate transmission quality.

To ensure the most reliable data transmission between the sensor nodes and central data collection and evaluation unit, the allocation of the frequency range(s) provided for data transmission can be monitored both at the installation site for the respective sensor node and the transmitting/receiving stations 203 (Wireless Data Concentrator) provided for wireless communication.

To this end, the receiver for both the sensor node and the Wireless Data Concentrator performs periodic measurements of the spectral power density within the provided frequency bands. The result is then sent back to the primary controller within the Wireless Data Concentrator. Based on the results of these measurements, the access point can in this way reach a decision about using frequency ranges suitable for reliable data transmission, and thereby proactively initiate a change in the transmission frequency range as needed. Depending on the used transmission method (fixed frequency or frequency hopping), such a change can involve switching the entire frequency range or omitting the occupied/faulted partial frequency ranges from the frequency hopping sequence.

Should the communications link between the sensor node and central data collection and evaluation unit fail despite implementation of the methods described above, adaptive route determination is used to build a new communications path via adjacent sensor nodes that are within signal range.

If the actual sensor node responsible for acquiring the respective physical parameter fails, and hence a measured data item is missing, the existing measured data from the adjacent sensors are used in an effort to estimate a measured value for the failed sensor within the framework of prescribed rules. One example of such a rule can involve a linear interpolation between the measured values of locally adjacent sensors.

The power supply for the wireless sensor nodes will be described below according to an exemplary embodiment of the invention:

There are several ways within an aircraft for the conversion of energy by the power supply unit of the sensor node, which will be described below.

For example, vibration generators for the decentralized power supply of sensor nodes can be installed in areas where the aircraft structure experiences larger vibrations (e.g., near the engines). The mechanical vibration energy in the form of stress or buckling can also be converted into electrical energy via piezoelectric transducers secured to the wings.

Thermoelectric transducers are used for the decentralized generation of electrical energy from temperature differences, e.g., of the kind encountered between the outside of the aircraft and air-conditioned interior (e.g., cabin) as well as stowage areas (cargo compartments) and areas for electrical installations (electronic bays), or between the air-conditioning system and the interior. The thermoelectric transducers are coupled to the aircraft hull in a thermally conductive manner. The temperature differences between these areas can here exceed 80° C. In addition, thermoelectric transducers can be secured to lines (e.g., bleed air lines (bleed air lines) or air-conditioning conduits) that carry warm air.

It is further possible and provided that electrical energy be obtained from the electromagnetic fields present in the aircraft by way of decoupling via suitable antennas.

It is further possible and provided in like measure that light be converted into electrical energy with photovoltaics. For example, light sources can be secured above the cabin ceiling paneling, which are then used to supply energy to distributed sensors within visual range of these light sources by converting the light into current.

For example, the individual components (transmitting/receiving unit, processor unit, power supply, sensor unit) of the individual sensor nodes are designed as modules with standardized interfaces. In this way, the functionality of the respective sensor node can be flexibly adjusted to the given requirements.

Figure 3:
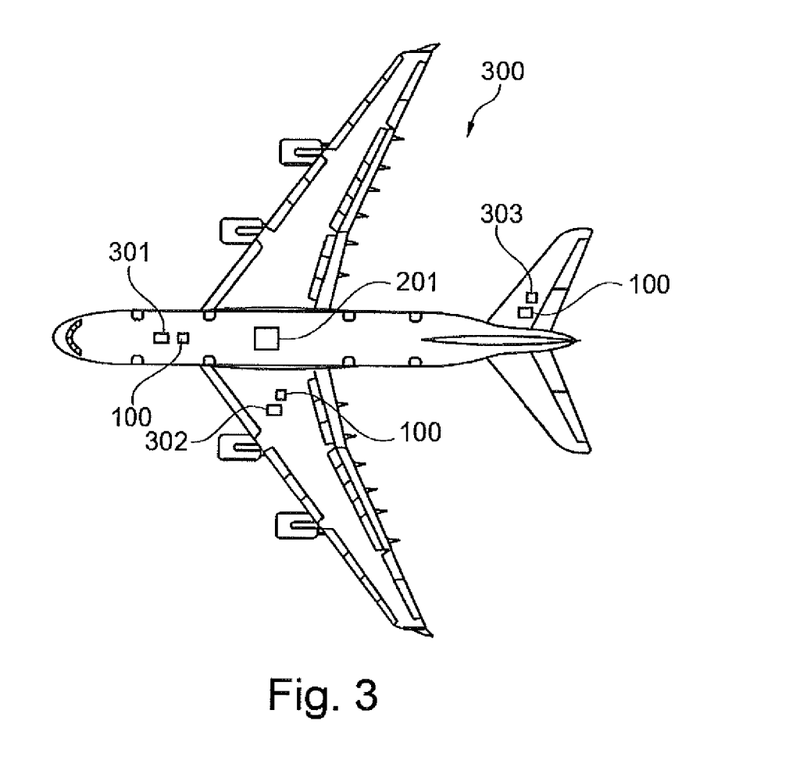
FIG. 3 shows an aircraft according to an exemplary embodiment of the invention.

FIG. 3 shows an aircraft 300 with a sensor network 200 described above, along with system components 301, 302, 303 to be monitored, which can be arranged in the wing, tail assembly and/or fuselage.

Figure 4:
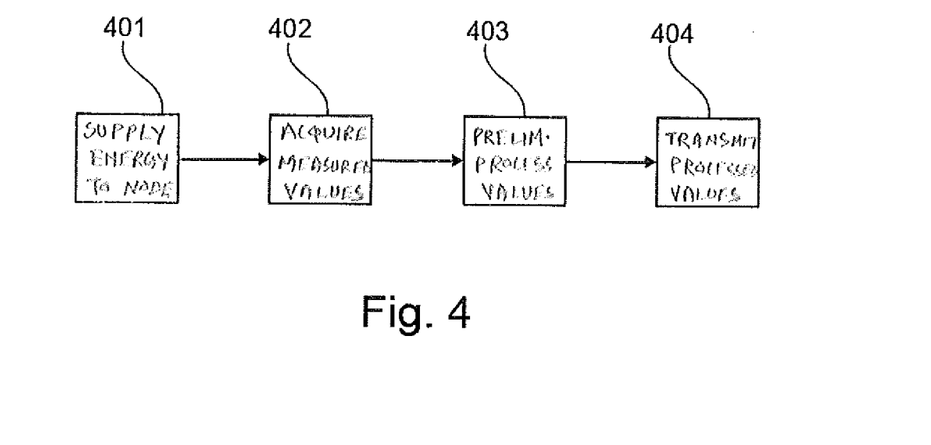
FIG. 4 shows a flowchart of a method according to an exemplary embodiment of the invention.

FIG. 4 presents a flowchart for a method in which various sensor nodes are supplied with electrical energy in step 401. The electrical energy is here produced by separate generators installed in the respective sensor nodes. In step 402, measured values are acquired in the area of the system components to be monitored by the corresponding sensor nodes. In step 403, the measured values are preliminarily processed. In step 404, the preliminarily processed measured values are wirelessly transmitted to a central data collection and evaluation unit.

Figure 5:
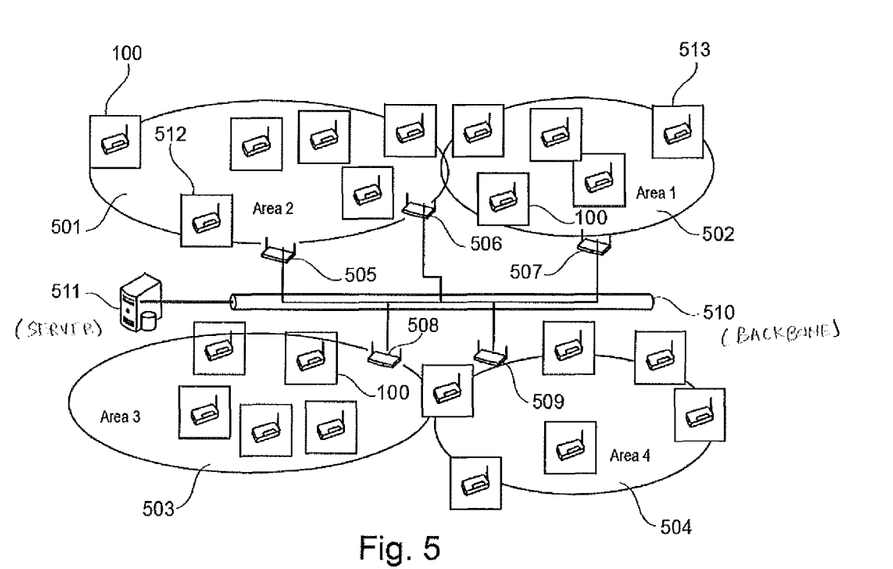
FIG. 5 shows a sensor node platform (sensor network) according to an exemplary embodiment of the invention.

FIG. 5 shows a sensor network that provides a sensor node platform and exhibits a plurality of partially identical, partially different sensor nodes of the kind described further above and below. Each of the sensor nodes can exhibit a sensor unit with which to acquire measured values. A plurality of the various sensor nodes can be arranged at areas 501, 502, 503, 504. For example, area 501 relates to the high lift flaps of the wings, area 502 relates to the landing gear, area 503 relates to the air conditioning system on board the aircraft, and area 504 relates to the cockpit door. Naturally, additional areas can also be provided.

Each area 501 to 504 can exhibit one or more data concentrators 505 to 509, which can wirelessly communicate with the sensor nodes 100 and collect the data of the sensor nodes allocated thereto. These data concentrators are hooked up to the "backbone" 510, which can be a conventional bus system connected to the central server 511.

In addition, specific sensor nodes (e.g., see sensor nodes 512, 513) can be provided for recording the information of various sensors. This information is made available to various aircraft user systems by way of a software interface.

The sensor network may be so complex in design as to not just detect the measured data from a wide variety of aircraft user systems. Rather, the sensor network can also perform a diagnosis and/or prediction. What this means is that malfunctions of the corresponding aircraft user systems can be diagnosed, identified and reported. Further, the expected development of physical parameters (e.g., temperature development, etc.) can be predicted. Apart from that, the sensor network can also be utilized for service purposes. For example, the fill levels of lubricating fluids or hydraulic fluids can be measured. Manual measurements of the fill levels are not necessary, but can also be performed.

Otherwise, the sensor network can be used to automatically identify aircraft parts/systems/subsystems/equipment.

In addition, the sensor network can be used to transmit data from electronic components that are not coupled to the data bus of the aircraft.

The individual sensors can also be used to localize aircraft components. The modular design of the individual sensor nodes permits the flexible use of the sensor platform. Additional wiring is not required, and installation is easy and very flexible. For example, modular components are used for the sensor nodes, making it possible to quickly and effectively configure the individual sensor nodes. The components can be furnished as modular systems with standardized plug connections.

Figure 6:
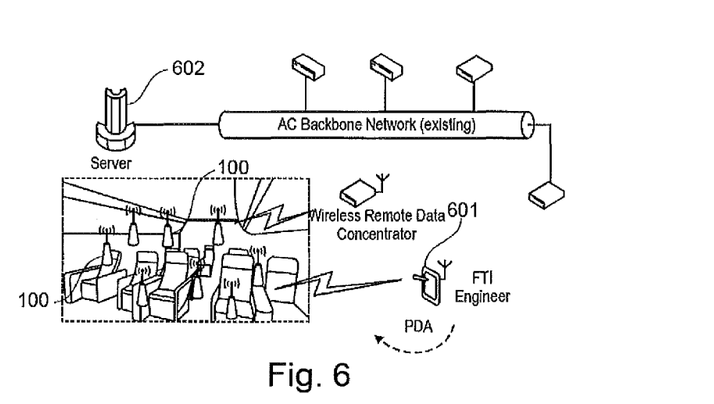
FIG. 6 shows another depiction of a sensor network according to an exemplary embodiment of the invention.

FIG. 6 shows a flight test installation (FTI) using a sensor network according to an exemplary embodiment of the invention. Since wiring is not required for the individual sensors, the installation outlay can be reduced. FIG. 6 shows a test scenario that can be set up to acquire the temperature in the cabin, for example. The end terminal 601, for example one that is operated by an FTI engineer, collects the measured temperature values of the different sensor nodes 100, and can be designed like a mobile device, such as a PDA or notebook, for example. The device 601 can also be designed like a wireless data concentrator (wireless remote data concentrator, RDC), which transmits the acquired sensor data to another system, for example a maintenance server 602, for further evaluation or storage.

The engineer can move freely through the cabin with the mobile device 601 in order to control the specified wireless sensor nodes 100 and, for example, set the physical measuring variables, sensor node sampling rates, etc., or query the system status. The mobile device 601 can also be used to reinitialize a complete measurement if new sensor nodes have been added.

In particular, this makes it possible to minimize outlay during both installation and measurement.

Figure 7:
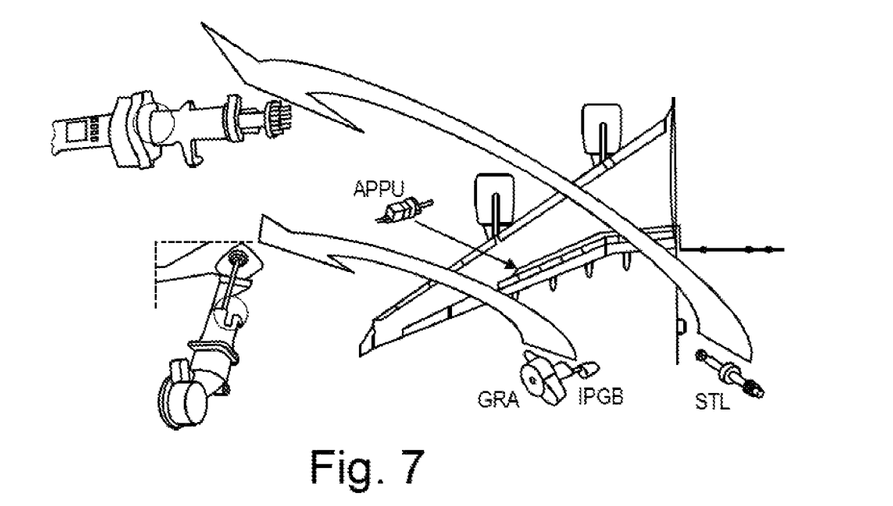
FIG. 7 shows a high lift system, which is equipped with sensor nodes according to an exemplary embodiment of the invention.
Figure 8:
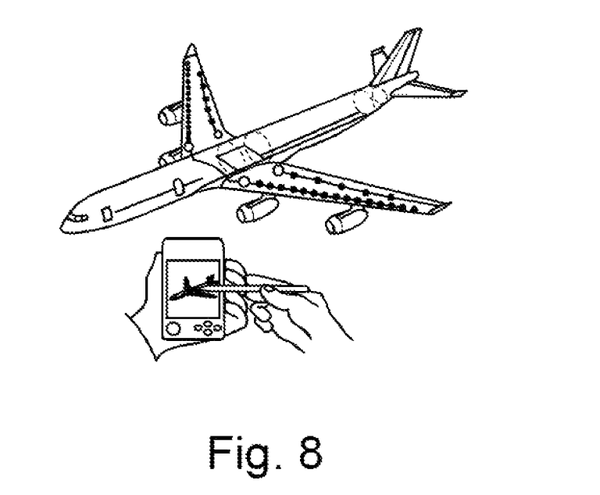
FIG. 8 shows a wireless torque limiter with sensor array.

FIG. 7 shows a high lift system for the wings of an aircraft, which exhibits sensor nodes according to an exemplary embodiment of the invention. For example, a so-called torque limiter (torque limiter) sensor can be used to quickly and easily determine the position of an indicator lever of the flap actuator gearing. This sensor node 100 (not shown on FIG. 7) can also wirelessly communicate with a PDA. If several sensors are installed in the aircraft, they can be queried sequentially or separately. The individual torque limiters do not have to be visually inspected in the event of a malfunction. Rather, it is sufficient to identify the corresponding torque limiter via the wireless controller (PDA), and show the measured data on the PDA screen or display them in the aircraft.

It generally holds true for this and other exemplary embodiments that, instead of representing the sensor information on a mobile device, the data can also be collected and synchronized in a global database provided in the aircraft.

Figure 9:
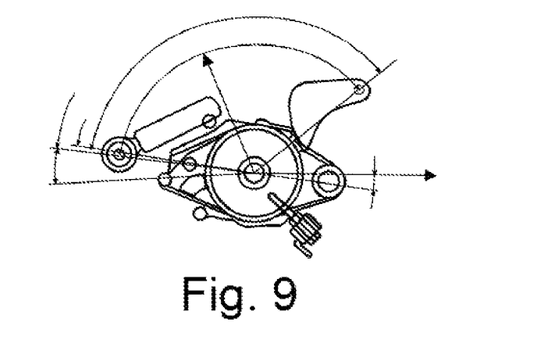
FIG. 9 shows an exemplary application for a GRA moisture sensor according to an exemplary embodiment of the invention.

The sensor network can also integrate so-called GRA moisture sensors (GRA stands for "geared rotary actuator"). The percentage of water in the fluid of the rotating actuator (see FIG. 9) can be monitored by installing a moisture sensor. This makes it possible to arrive at a prediction for when to change out the flushing agent, thereby preventing a malfunction by the device.

For example, the wireless sensor nodes can also be offered as retrofit solutions, and hence upgraded. Here as well, the GRA's that have to be serviced can be identified by pressing a button in the mobile device (e.g., the PDA). This can be represented both on the PDA and on a central maintenance system in the cockpit.

Figure 10:
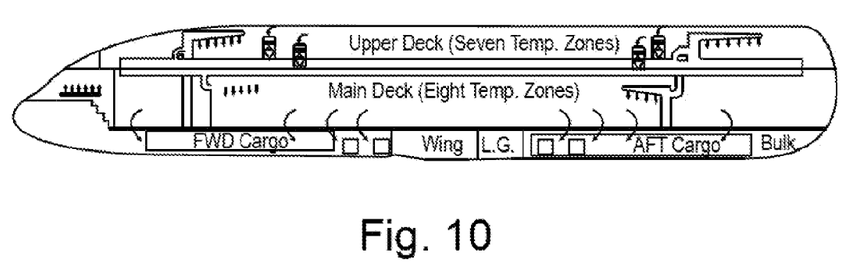
FIG. 10 shows the temperature acquisition unit in the fuselage according to another exemplary embodiment of the invention.

As evident from FIG. 10, individual sensor nodes can also be used to monitor the temperature of the upper deck, main deck and cargo holds. Since the sensor nodes can be wirelessly integrated into the network, no cabling is required, in particular no hard-wired connection to the main controller of the air conditioning system. Each sensor node can wirelessly transmit its measured temperatures to the main controller. Implementing a large number of individual sensor nodes enables an improved regulation of the air conditioning system.

Individual sensor nodes can also be used for monitoring the heater in the floor panels. In this way, the heating circuits can be wirelessly monitored and also controlled as needed.

Figure 11:
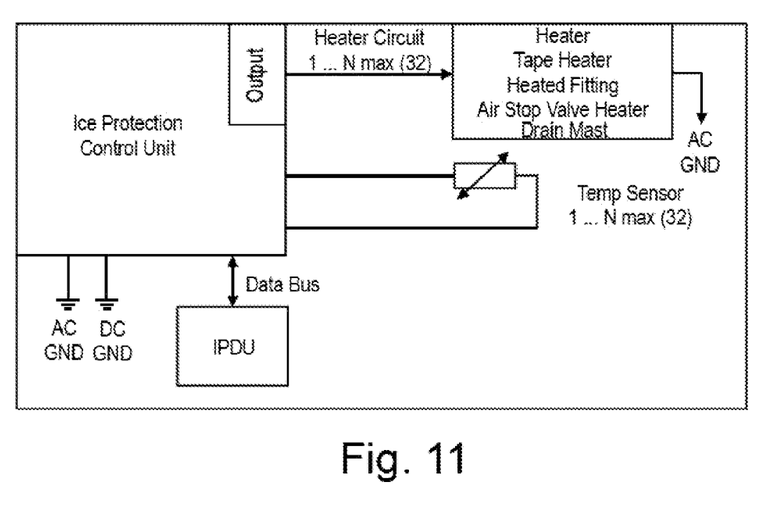
FIG. 11 shows a water supply system, which can be fitted with a temperature sensor node according to another exemplary embodiment of the invention.

FIG. 11 shows the architecture of an ice protection system for the water lines of an aircraft. This system is intended to prevent icing in and around the lines. For example, wireless temperature sensor nodes are integrated into the water lines and/or heating elements, so that the current temperature conditions can be monitored, and the heating elements controlled accordingly.

Figure 12:
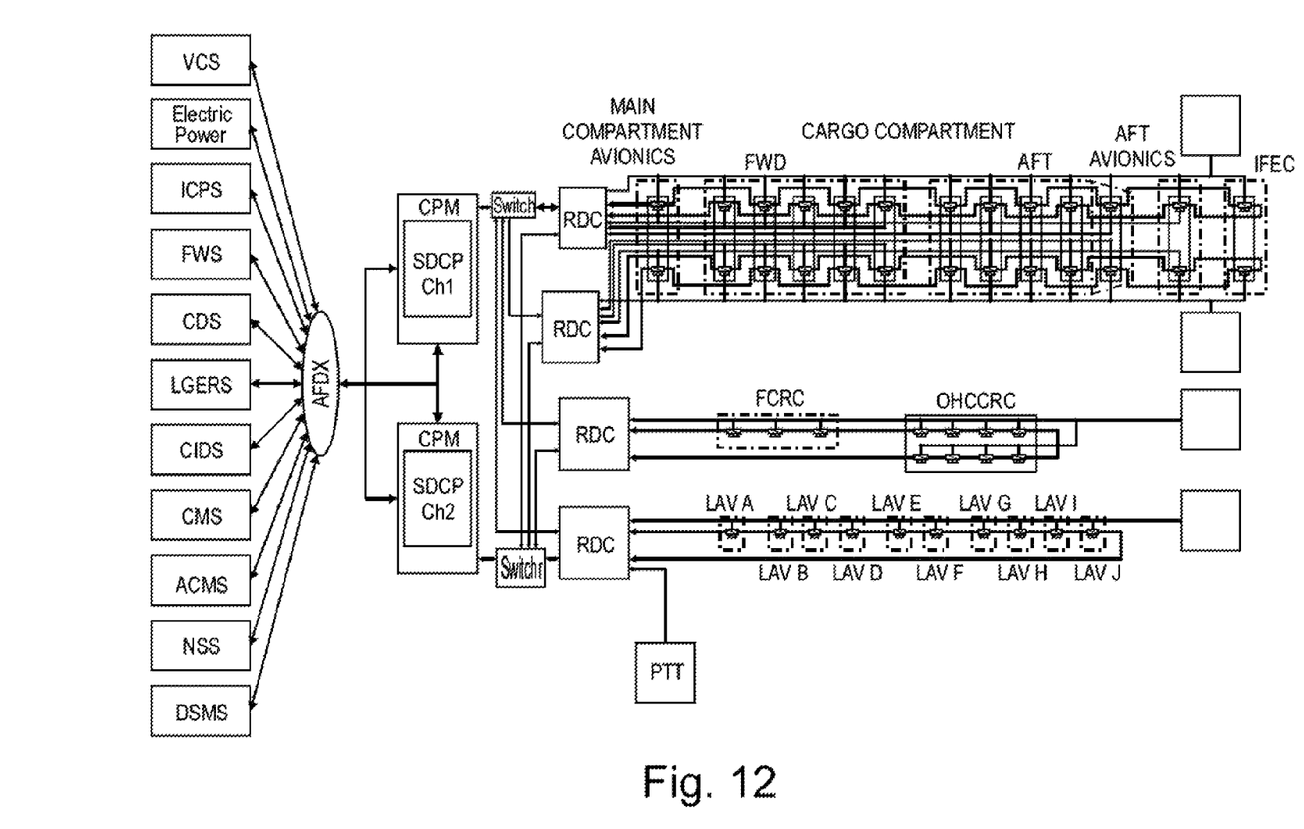
FIG. 12 shows a fire alarm system, which can be fitted with sensor nodes according to another exemplary embodiment of the invention.

The sensor nodes can also be used for a fire and smoke detection system. FIG. 12 presents an example for the architecture of a fire/smoke detection system in a pressurized cabin area. The fire/smoke-detecting sensor nodes here provide wireless data communication between the individual fire/smoke detectors and the controller function. Wired connections to the communication buses are not required. A wireless gateway can be used in place of a CAN data interface for controlling the fire/smoke detection control function.

In addition, it is possible to use the sensor nodes for a light control system.

Figure 13:
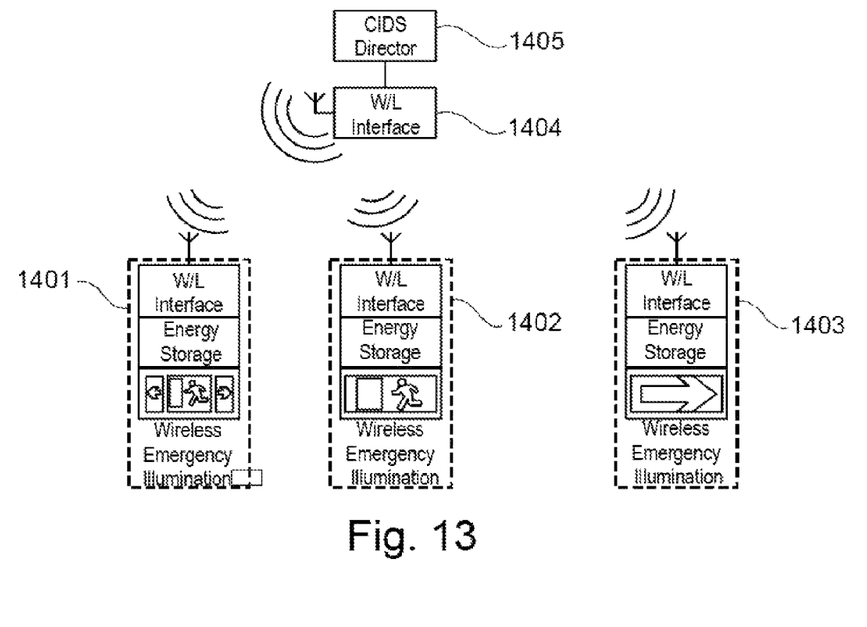
FIG. 13 shows a wireless control system for an emergency lighting unit with sensor nodes according to another exemplary embodiment of the invention.

Several of the sensor nodes can also be used in an emergency lighting system for monitoring its function. FIG. 13 shows the configuration of such a monitoring system.

Several sensor nodes 1401, 1402, 1403 are provided, which are integrated into the corresponding emergency lighting units, and exhibit the corresponding energy storage units for this purpose. The sensor nodes wirelessly communicate with a W/L interface 1404, which is coupled to the so-called CIDS director 1405.

Therefore, the emergency lighting units are autonomous systems that can exhibit a service life of several years. This means that the wireless emergency lighting units have enough energy reserves to ensure communication (e.g., continuous status reports) and activate the lights for a specific period of time (e.g., ten minutes) over the course of several years.

In addition, several of the sensor nodes can be incorporated into a standalone identification system (standalone identification system, SIS), so as to provide configuration information from certain aircraft user systems. To this end, use can be made of small, energy-efficient wireless transceivers that are also able to store data, and are integrated into an SIS module.

Figure 14:
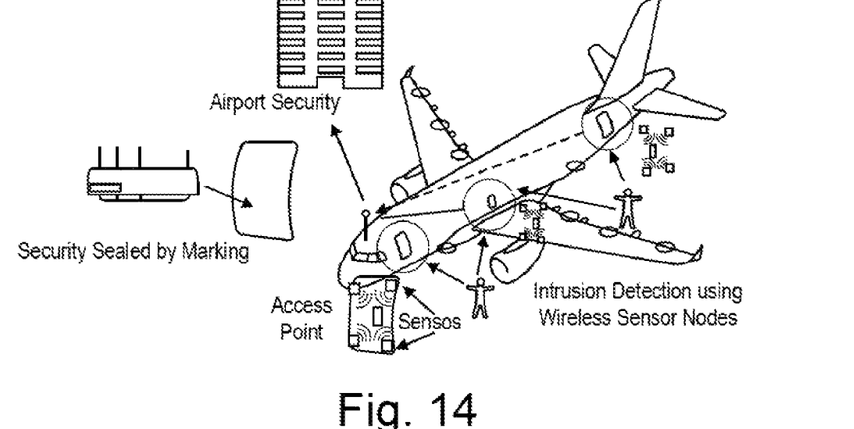
FIG. 14 shows a door monitoring system with sensor nodes according to another exemplary embodiment of the invention.

FIG. 14 shows the use of sensor nodes 100 according to the invention for monitoring doors. This makes it possible to detect whether doors or flaps are open, or whether an attempt to gain forcible entry is to be made.

For example, motion sensors and/or switches can be used for this purpose. After a specific process has been reliably detected by a single [sensor] or a sensor group, an alarm message is wirelessly transmitted to a central access point located in proximity to the door. This access point can then relay the alarm message to a system, for example which sends a warning to the security personnel at the airport.

In another exemplary embodiment, the sensor nodes can be used for so-called "discrete key lines".

Figure 15:
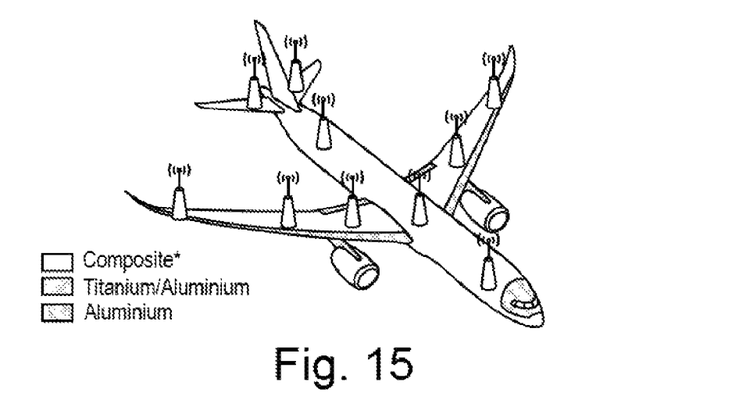
FIG. 15 shows the structural monitoring unit in an aircraft according to another exemplary embodiment of the invention.

It is further possible to use the sensor nodes for structural monitoring (structural health monitoring), which involves continuously and autonomously monitoring distortions, environmental and flight parameters and defects. Integrated sensors are provided for this purpose, as shown by example on FIG. 15.

Another exemplary embodiment provides that the sensor nodes be used as proximity switches (proximity switches) for so-called PAX seats. This makes it possible to cut servicing times, since the sensor nodes acquire the seat status, and wirelessly transmit it to a main controller or notify the aircraft/maintenance personnel. For example, damage to seatbelts can be detected in this way by mechanically integrating wireless sensor nodes into the seatbelt.

Sensor nodes can also be used for identifying and localizing pieces of equipment. For example, this comes in handy for life vests or seats into which the sensor nodes can be incorporated. The built-in sensor nodes can be localized, since this functionality is inherently present in the sensor network. Should a very precise localization to within several centimeters be necessary, the characteristics of the sensor network can be combined with detected localization mechanisms, for example, the received power or a time delay during data transmission.

In another exemplary embodiment of the invention, the sensor nodes can be used for the localization and tracking of passengers, and for seat identification and localization. This is depicted on FIG. 16. A so-called digital boarding assistant (DIGI BA) exhibiting a corresponding sensor node can be used for this purpose. For example, this case involves a device the size of a credit card, which exhibits an RF transceiver, a display, a beeper and input buttons, and is powered by a battery. This device can be handed to passengers in the form of a member card for a frequent flyer program, or as a boarding pass during check-in, for example.

Figure 16:
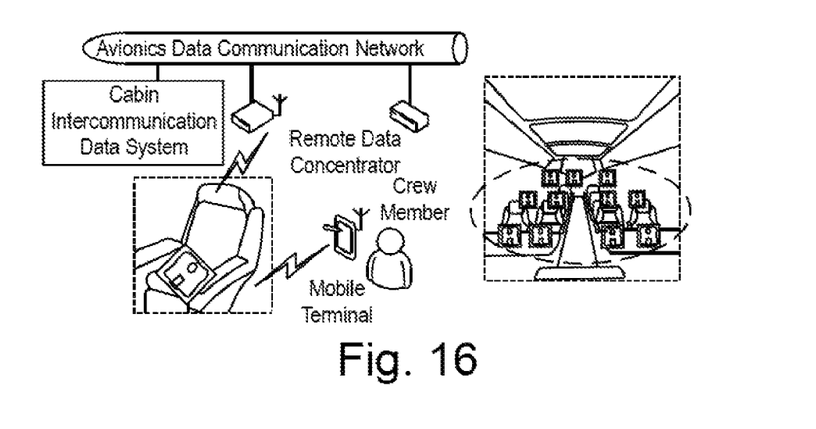
FIG. 16 shows the use of a sensor node network for seat identification and localization according to another exemplary embodiment of the invention.

Such a device is carried into the cabin by each passenger, and periodically sends data packets to the central server. This makes it possible to ascertain the current whereabouts of each passenger.

The sensor nodes can also be used in the landing gear to monitor the state of the braking systems, oil pressure or air pressure in the tires.

The deployment and retraction of the landing gear can also be monitored.

Additional sensor nodes can be used for monitoring the temperature of the brakes, or the oil pressure and temperature of the landing gear. Sensor nodes can also be used for monitoring and displaying the state of brakes (brake wear monitoring).

The sensor nodes can also be used for monitoring the landing flaps (landing gear health monitoring system). Impacts and stresses on the landing flaps, accelerations, pressure, moisture, temperature of brakes and other parameters can here be measured. The sensor data can be wirelessly transmitted to corresponding receivers (RDC's), which are accommodated in the cargo hold, or directly to the avionic server.

In addition, it must be pointed out that "exhibit", "comprise" or "encompass" do not preclude any other elements or steps, and that "a" or "the" do not rule out a plurality. Let it further be noted that features or steps described with reference to one of the above exemplary embodiments can also be used in combination with other features or steps from other exemplary embodiments described above. Reference numbers in the claims must not be construed as a limitation.

The invention claimed is:

1. A sensor node for a wireless sensor network for acquiring measured values in an aircraft, wherein the sensor node comprises:
   a sensor unit for acquiring the measured values;
   a power supply unit for supplying the sensor node with electrical energy; and
   a transmitting and receiving unit for wirelessly transmitting the acquired measured values to a central data collection and evaluation unit;
   wherein the transmitting and receiving unit is configured to transmit the acquired measured values in two or more separate frequency ranges and to automatically change the frequency range for transmission when a flight status of the aircraft changes, and
   wherein the sensor node is configured to perform an active route determination to build a new communication path via adjacent sensor nodes that are within signal range should a communication link between the sensor node and the central data collection and evaluation unit fail.

2. The sensor node of claim 1, wherein the power supply unit is configured to autonomously supply power to the sensor node through energy conversion.

3. The sensor node of claim 2, wherein the power supply unit comprises a vibration generator for providing the sensor node with a decentralized power supply.

4. The sensor node of claim 2, wherein the power supply unit comprises a thermoelectric transducer for providing the sensor node with a decentralized power supply.

5. The sensor node of claim 2, wherein the power supply unit comprises an antenna to receive electromagnetic energy for providing the sensor node with a decentralized power supply.

6. The sensor node of claim 2, wherein the power supply unit comprises a photovoltaic unit to convert light into electrical energy for providing the sensor node with a decentralized power supply.

7. The sensor node of claim 1, wherein the transmitting and receiving unit is designed in such a way as to automatically change the frequency range for transmission when an event arises.

8. The sensor node of claim 1, wherein the transmitting and receiving unit is configured to change the transmission frequency based on a prescribed sequence.

9. The sensor node of claim 1, wherein the sensor unit is configured to ascertain the identity of connected sensors and relay this information to the processor unit.

10. The sensor node of claim 1, wherein the sensor unit, the power supply unit and the transmitting and receiving unit are configured in a modular manner.

11. A sensor network for an aircraft, wherein the sensor network comprises:
- a plurality of sensor nodes and a central data collection and evaluation unit for collecting and evaluating the transmitted measured data, wherein the sensor nodes comprise:
- a sensor unit for acquiring the measured values;
- a power supply unit for supplying the sensor node with electrical energy;
- a transmitting and receiving unit for wirelessly transmitting the acquired measured values to a central data collection and evaluation unit;
- wherein transmitting and receiving unit is configured to transmit the acquired measured values in two or more separate frequency ranges and to automatically change the frequency range for transmission when a flight status of the aircraft changes, and
- wherein each sensor node is configured to perform an active route determination to build a new communication path via adjacent sensor nodes that are within signal range should a communication link between the sensor node and the central data collection and evaluation unit fail.

12. The sensor network of claim 11, wherein the network is configured for monitoring an allocation of a frequency range provided for transmission purposes at both the installation site for the sensor node and at the transmitting and receiving station of the sensor network.

13. The sensor network of claim 11, wherein the network is configured for adaptive route determination in order to identify a new communication path if the transmission signal quality drops below a prescribed level.

14. A method for ascertaining a state of a system component in an aircraft, wherein the method involves the following steps:
- supplying a sensor node with electrical energy by way of a power supply unit in the sensor node;
- acquiring measured values in the area of the system component via the sensor node;
- wirelessly transmitting the acquired measured values to a central data collection and evaluation unit;
- automatically changing a frequency range for transmitting the acquired measured values when a flight status of the aircraft changes; and
- performing, at the sensor node, an active route determination to build a new communication path via adjacent sensor nodes that are within signal range should a communication link between the sensor node and the central data collection and evaluation unit fail.

* * * * *